A. J. BLODGETT.
Rake.
No. 18,079.
Patented Sept. 1, 1857.
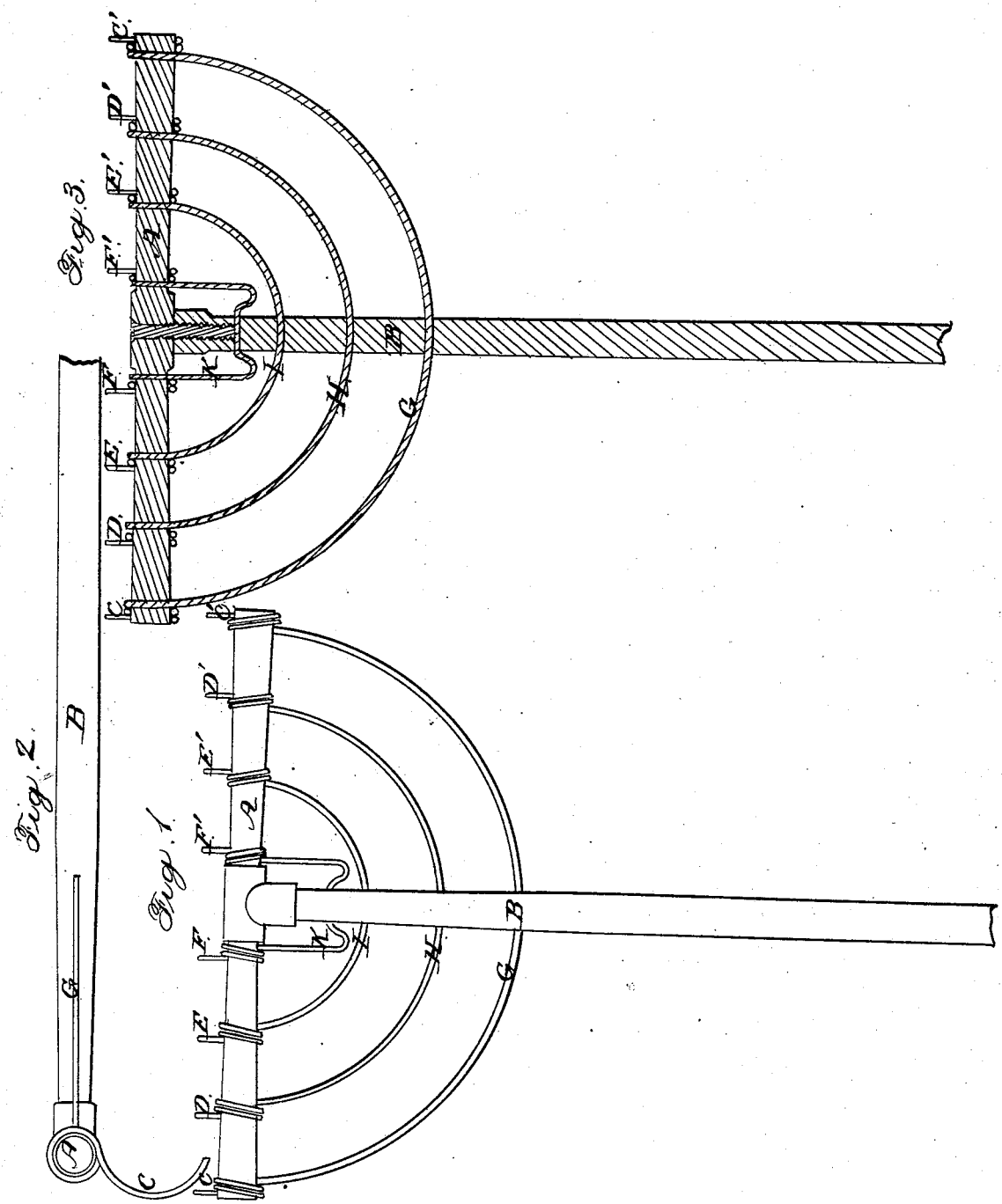

UNITED STATES PATENT OFFICE.

ANDREW J. BLODGETT, OF NEWPORT, NEW HAMPSHIRE.

IMPROVEMENT IN RAKES.

Specification forming part of Letters Patent No. 18,079, dated September 1, 1857.

*To all whom it may concern:*

Be it known that I, ANDREW J. BLODGETT, of Newport, in the county of Sullivan and State of New Hampshire, have invented a new and useful Improvement in the agricultural implement usually termed a "Rake"; and I do hereby declare that the same is fully described and represented in the following specification and accompanying drawings, of which—

Figure 1 is a top view, Fig. 2 a side elevation, and Fig. 3 a horizontal section, of a rake having the said improvement.

The nature of my invention consists in making each arched brace-rod and one or two spring-teeth in one piece or rod of wire, and so as to extend through the rake-head and into the handle, whereby the teeth are not only firmly supported by the braces, but the latter is made to contribute greatly to the strength of the whole instrument.

In the drawings, A denotes the rake-head, while B exhibits the handles as extending from the middle of and at right angles to the said head. The spring-teeth are shown at C D E F C' D' E' F', while the arched braces or bows are shown at G H I K.

In applying each brace and two teeth to the handle and head a piece of wire of sufficient length to form the brace and its two teeth is to be passed transversely through the handle, while the middle part of the wire comes into the axis of the handle. Next the two projecting halves of the wire are to be bent around and inserted and drawn through the rake-head, and afterward each part is to be coiled or wound around the head one or more times and curved in the form of a spring-tooth, as shown in the drawings, it being understood that previous to so applying the wire the rake-head and handle are to be pierced with holes for the reception of the wire. Instead of making each brace-rod and two teeth in one piece of wire, a separate brace-rod may be used to each tooth, it being in one piece with the tooth and passed through the rake-head and inserted and fixed in the handle. Any number of braces may be so applied to the rake-head and handle, and so as to add strength to the same, as well as to support and fix the spring-teeth in the rake-head.

I do not claim spring-teeth applied to a rake-head; but

I claim—

Making each arched brace-rod and one or two teeth in one piece of wire and extending the same through the rake-head and into or through the handle, substantially as specified.

In testimony whereof I have hereunto set my signature this 13th day of July, A. D. 1857.

ANDREW J. BLODGETT.

Witnesses:
SIMON A. EMERY,
FREDERICK CHAPIN.